United States Patent
Takahashi

(10) Patent No.: US 8,248,179 B2
(45) Date of Patent: Aug. 21, 2012

(54) CIRCUIT MODULE

(75) Inventor: Yasuhiro Takahashi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/053,252

(22) Filed: Mar. 22, 2011

(65) Prior Publication Data

US 2011/0234332 A1    Sep. 29, 2011

(30) Foreign Application Priority Data

Mar. 23, 2010    (JP) .................. 2010-065940

(51) Int. Cl.
*H03H 7/38* (2006.01)

(52) U.S. Cl. ................. 333/24.2; 455/78; 333/1.1

(58) Field of Classification Search ........... 333/1.1, 333/24.2; 455/78, 84
See application file for complete search history.

(56) References Cited

U.S. PATENT DOCUMENTS

| | | | | |
|---|---|---|---|---|
| 3,857,113 A | * | 12/1974 | Huang | ............... 333/141 |
| 2004/0106389 A1 | * | 6/2004 | Chiou | ............... 455/260 |
| 2006/0116088 A1 | | 6/2006 | Block et al. | |

FOREIGN PATENT DOCUMENTS

| | | |
|---|---|---|
| JP | 2005-531951 A | 10/2005 |
| JP | 2006-311455 A | 11/2006 |
| JP | 2008-154201 A | 7/2008 |

* cited by examiner

*Primary Examiner* — Stephen Jones
(74) *Attorney, Agent, or Firm* — Keating & Bennett, LLP

(57) ABSTRACT

In a circuit module, a core isolator includes a ferrite and a permanent magnet that is arranged to apply a direct-current field to the ferrite. A switch outputs to a signal path a high-frequency signal outputted from the core isolator. A SAW filter is provided on the signal path. A matching circuit is provided on the signal path and provides impedance matching between the output impedance of the core isolator and the input impedance of the SAW filter.

6 Claims, 7 Drawing Sheets

CIRCUIT MODULE

BACKGROUND OF THE INVENTION

1. Field of the Invention

The present invention relates to a circuit module, and specifically, relates to a circuit module including an isolator.

2. Description of the Related Art

As an existing circuit module, for example, there is known a transmission device disclosed in Japanese Unexamined Patent Application Publication No. 2008-154201. The transmission device includes a power amplifier, an isolator, a switch, a first duplexer, and a second duplexer. The power amplifier is a so-called multi-band power amplifier, which amplifies and outputs a transmission signal of a first frequency band and a transmission signal of a second frequency band, the first frequency band and the second frequency band being different from each other. The isolator allows the transmission signal of the first frequency band and the transmission signal of the second frequency band, which are outputted from the power amplifier, to pass therethrough, and does not output, to the power amplifier, a signal inputted from the opposite side of the power amplifier. The switch outputs the transmission signals having passed through the isolator, to the first duplexer or the second duplexer. The first duplexer is a filter that allows the transmission signal of the first frequency band to pass therethrough, and the second duplexer is a filter that allows the transmission signal of the second frequency band to pass therethrough.

In the transmission device as described above, impedance matching between the output impedance of the isolator and the input impedance of the first duplexer and the input impedance of the second duplexer needs to be optimized for the transmission signal of the first frequency band and the transmission signal of the second frequency band, respectively. Although not described in Japanese Unexamined Patent Application Publication No. 2008-154201, a matching circuit for providing impedance matching is generally provided in the isolator.

Since the frequency bands of the signals that pass through the first duplexer and the second duplexer are different from each other, each duplexer is designed such that the input impedance is 50Ω in the passband of each duplexer. Thus, it is difficult for a matching circuit on the output side of the isolator to provide impedance matching to both the input impedance of the first duplexer and the input impedance of the second duplexer. Therefore, the output-side matching circuit of the existing isolator is designed so as to provide matching in a frequency that is optimal for both the passing frequency band of the first duplexer and the passing frequency band of the second duplexer, for example, in an intermediate frequency between the first frequency band and the second frequency band. However, with such designing, the impedances do not match for both the signal of the first frequency band and the signal of the second frequency band, and thus a loss occurs in the transmission signal. Further, in order to prevent the occurrence of a loss in the transmission signal, a structure is considered in which matching circuits are provided between the switch and the first duplexer and between the switch and the second duplexer. In this case, however, since a plurality of matching circuits is used, the number of elements is increased and the size of the transmission device is increased.

As described above, the transmission device described in Japanese Unexamined Patent Application Publication No. 2008-154201 causes a loss in the transmission signal and needs to be provided with matching circuits at three locations. Thus, the number of elements is increased, and the size of the transmission device is increased.

SUMMARY OF THE INVENTION

Preferred embodiments of the present invention provide a circuit module that can reduce its size without causing a loss in a transmission signal.

A circuit module according to a preferred embodiment of the present invention includes a core isolator including a ferrite; a permanent magnet arranged to apply a direct-current field to the ferrite; a first center electrode that is provided in the ferrite, the first center electrode being connected at one end thereof to an input port and connected at another end thereof to an output port; a second center electrode that is provided in the ferrite so as to intersect the first center electrode in an insulating manner, the second center electrode being connected at one end thereof to the output port and connected at another end thereof to a ground port; a branch portion that is connected at one end thereof to the output port of the core isolator and outputs, to a first signal path or a second signal path, a signal outputted from the output port; a first processing circuit that is provided on the first signal path; and a first matching circuit that is provided on the first signal path so as to be connected to a switch terminal on the first signal path side of the branch portion, to provide impedance matching between an output impedance of the core isolator and an input impedance of the first processing circuit.

According to various preferred embodiments of the present invention, the size of a circuit module can be reduced without causing a loss in a transmission signal.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, a circuit module according to a preferred embodiment of the present invention will be described with reference to the drawings.

Figure 1:
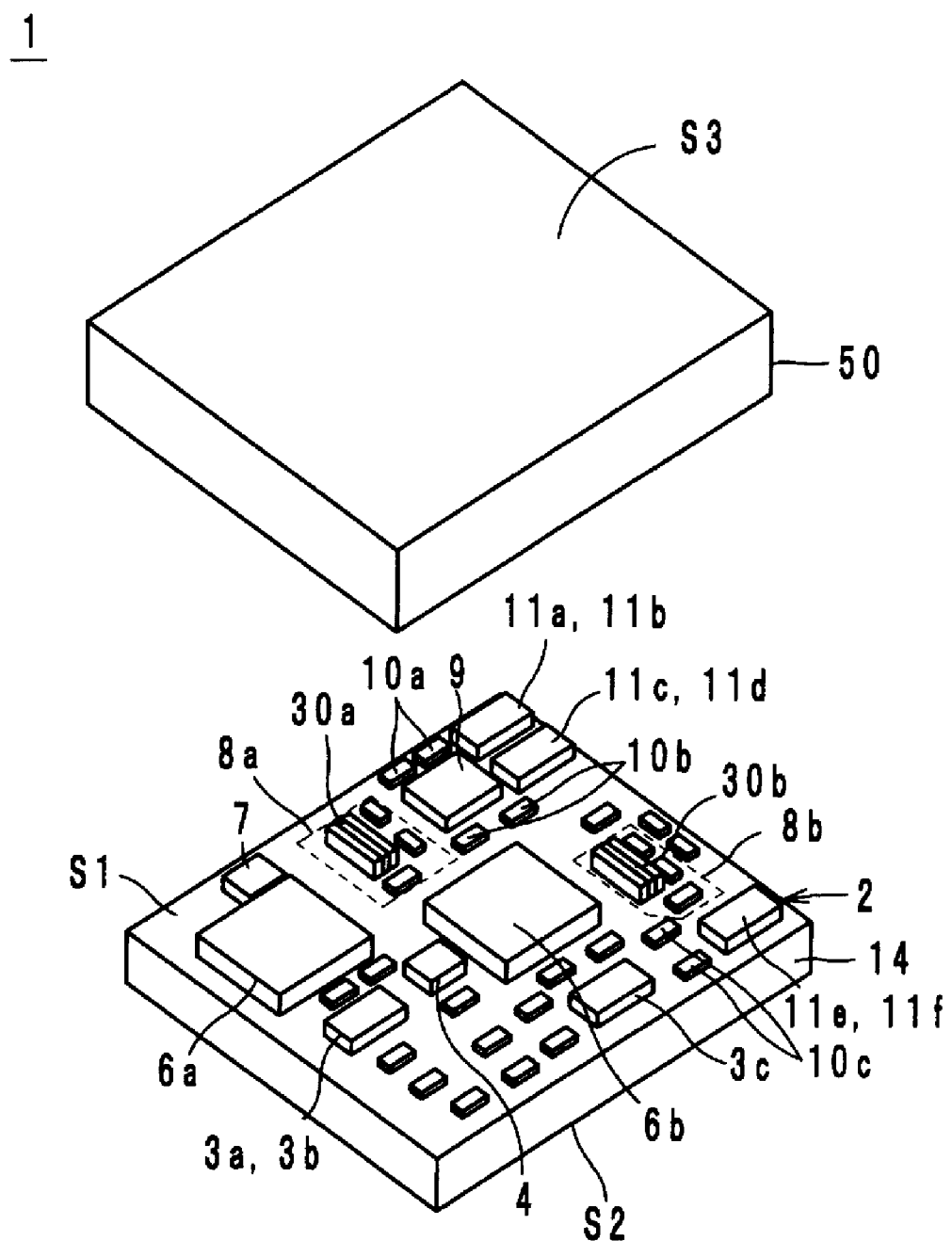
FIG. 1 is an exploded perspective view of a circuit module according to a preferred embodiment of the present invention.
Figure 2:
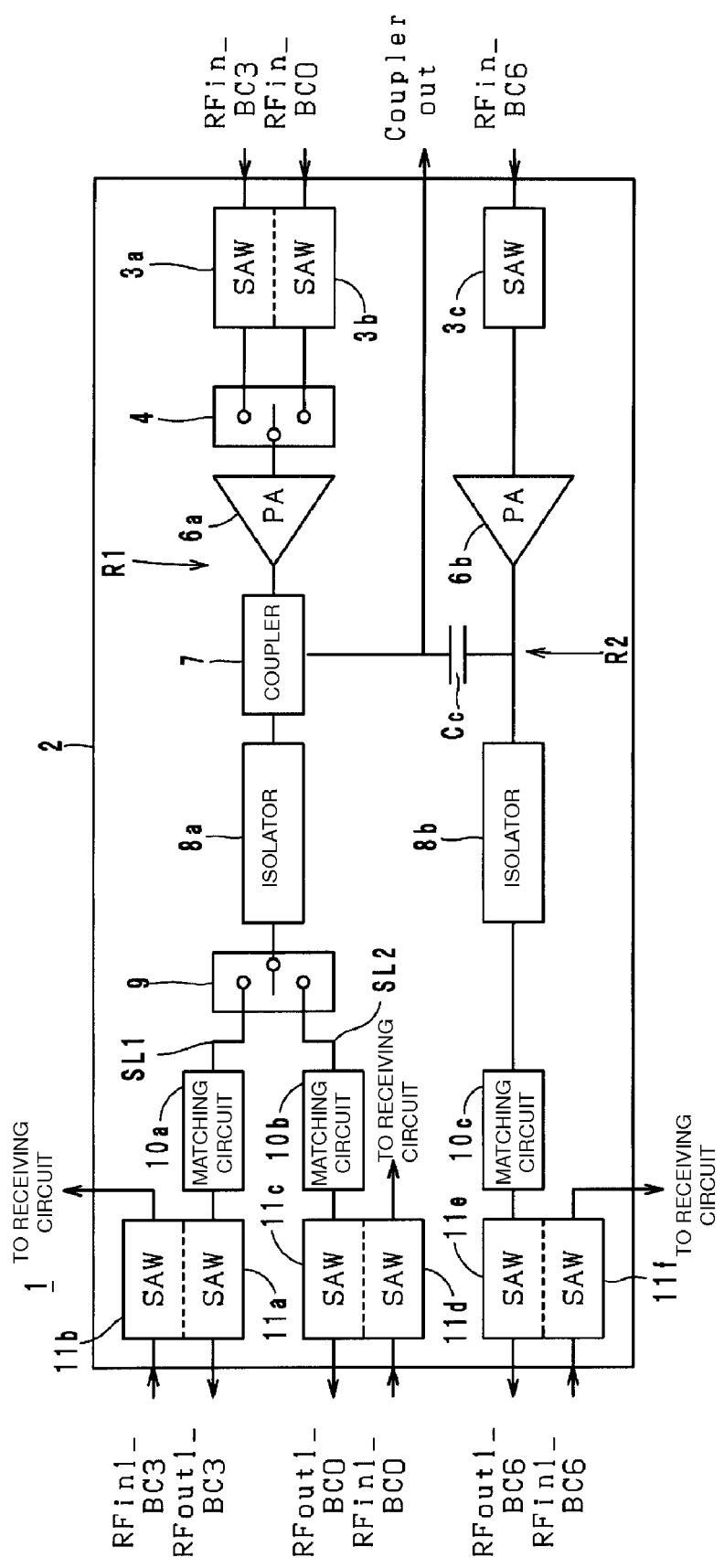
FIG. 2 is a block diagram of the circuit module in FIG. 1.

First, a configuration of the circuit module will be described with reference to the drawings. FIG. 1 is an exploded perspective view of the circuit module 1 according to a preferred embodiment of the present invention. FIG. 2 is a block diagram of the circuit module 1 in FIG. 1. In FIG. 1, only main electronic components are shown, and small electronic components such as a chip capacitor and a chip inductor are omitted.

The circuit module 1 constitutes a portion of a transmission circuit of a wireless communication device such as a cellular phone, and amplifies and outputs multiple types of high-frequency signals. As shown in FIGS. 1 and 2, the circuit module 1 includes a circuit board 2, transmission paths R1 and R2 (not shown in FIG. 1), and a metal case 50.

As shown in FIG. 1, the circuit board 2 preferably is a plate-shaped multilayer printed board on which and in which electric circuits are provided. The circuit board 2 includes principal surfaces S1 and S2.

As shown in FIG. 2, the transmission path R1 amplifies and outputs input signals RFin_BC0 (800 MHz band) and RFin_BC3 (900 MHz band) as output signals RFout1_BC0 (800 MHz band) and RFout1_BC3 (900 MHz band). As shown in FIG. 2, the transmission path R1 includes SAW filters (surface acoustic wave filters) 3a and 3b, a switch 4, a power amplifier (amplifier) 6a, a coupler 7, an isolator 8a, a switch 9, matching circuits 10a and 10b, and SAW filters 11a to 11d. As shown in FIG. 1, the SAW filters 3a and 3b, the switch 4, the power amplifier 6a, the coupler 7, the isolator 8a, the switch 9, the matching circuits 10a and 10b, and the SAW filters 11a to 11d are electronic components mounted on the principal surface S1 of the circuit board 2.

As shown in FIG. 1, the SAW filters 3a and 3b are preferably defined by or included in one electronic component, and are band-pass filters each of which allows only a signal of a predetermined frequency band to pass therethrough. As shown in FIG. 2, the input signal RFin_BC3 is inputted to the SAW filter 3a. In addition, as shown in FIG. 2, the input signal RFin_BC0 is inputted to the SAW filter 3b.

As shown in FIG. 2, the switch 4 is connected to the SAW filters 3a and 3b and the power amplifier 6a, and outputs either the input signal RFin_BC3 outputted from the SAW filter 3a or the input signal RFin_BC0 outputted from the SAW filter 3b, to the power amplifier 6a.

The power amplifier 6a amplifies the input signal RFin_BC0 or RFin_BC3 outputted from the switch 4. As shown in FIG. 2, the power amplifier 6a is connected to an input terminal (not shown) of the coupler 7 at the subsequent stage. As shown in FIG. 2, the coupler 7 is connected to an input terminal (not shown) of the isolator 8a. The coupler 7 separates and outputs a portion of the input signal RFin_BC0 or RFin_BC3 amplified by the power amplifier 6a, as an output signal Coupler out to the outside of the circuit module 1, and outputs the input signal RFin_BC0 or RFin_BC3 to the isolator 8a at the subsequent stage.

As shown in FIG. 2, the isolator 8a is a non-reciprocal circuit element that outputs the input signal RFin_BC0 or RFin_BC3 to the switch 9 at the subsequent stage and that does not output a signal reflected from the switch 9 side, to the coupler 7 side. The isolator 8a will be described in detail later.

As shown in FIG. 2, the switch 9 outputs the input signals RFin_BC3 and RFin_BC0 outputted from the isolator 8a, to signal paths SL1 and SL2. Specifically, the switch 9 outputs the input signal RFin_BC3 outputted from the isolator 8a, to the signal path SL1, and outputs the input signal RFin_BC0 outputted from the isolator 8a, to the signal path SL2.

The SAW filters 11a and 11c are provided on the signal paths SL1 and SL2, respectively, and constitute processing circuits that respectively perform predetermined processes on the input signals RFin_BC3 and RFin_BC0 and that output the resultant signals as the output signal RFout1_BC3 and RFout1_BC0 to the outside of the circuit module 1. Specifically, the SAW filter 11a preferably is a band-pass filter that allows a high-frequency signal of a predetermined frequency band (900 MHz band), which is a first frequency band, to pass therethrough and that does not allow a high-frequency signal of a frequency out of the predetermined frequency band to pass therethrough. The SAW filter 11c preferably is a band-pass filter that allows a high-frequency signal of a predetermined frequency band (800 MHz band), which is a second frequency band, to pass therethrough and that does not allow a high-frequency signal of a frequency out of the predetermined frequency band to pass therethrough. Note that allowing a high-frequency signal to pass therethrough means that the insertion loss of the high-frequency signal is relatively low, and not allowing a high-frequency signal to pass therethrough means that the insertion loss of the high-frequency signal is relatively high.

The matching circuit 10a is a circuit that is provided on the signal path SL1 and that provides impedance matching between the output impedance of a core isolator 30a (the details will be described later) included in the isolator 8a and the input impedance of the SAW filter 11a. The matching circuit 10a is provided between the switch 9 and the SAW filter 11a, and preferably includes, for example, a combination of a capacitor, an inductor, and the like. The matching circuit 10b is a circuit that is provided on the signal path SL2 and that provides impedance matching between the output impedance of the core isolator 30a (the details will be described later) included in the isolator 8a and the input impedance of the SAW filter 11c. The matching circuit 10b is provided between the switch 9 and the SAW filter 11c, and preferably includes, for example, a combination of a capacitor, an inductor, and the like.

The SAW filters 11b and 11d respectively perform predetermined processes on the input signals RFin1_BC3 and RFin1_BC0 and output the resultant signals to receiving circuits (not shown). Note that the SAW filters 11a and 11b preferably include one electronic component as shown in FIG. 1, and the SAW filters 11c and 11d preferably include one electronic component as shown in FIG. 1.

As shown in FIG. 2, the transmission path R2 amplifies and outputs an input signal RFin_BC6 (2 GHz band) as an output signal RFout1_BC6 (2 GHz band). As shown in FIG. 2, the transmission path R2 preferably includes a SAW filter 3c, a power amplifier 6b, an isolator 8b, a matching circuit 10c, and SAW filters 11e and 11f. As shown in FIG. 1, the SAW filter 3c, the power amplifier 6b, the isolator 8b, the matching circuit 10c, and the SAW filters 11e and 11f are electronic components mounted on the circuit board 2.

The SAW filter 3c is a band-pass filter that allows only a signal of a predetermined frequency band to pass therethrough. As shown in FIG. 2, the input signal RFin_BC6 is inputted to the SAW filter 3c.

As shown in FIG. 2, the power amplifier 6b amplifies the input signal RFin_BC6 outputted from the SAW filter 3c. As shown in FIG. 2, the isolator 8b is a non-reciprocal circuit element that outputs the input signal RFin_BC6 to the matching circuit 10c at the subsequent stage and that does not output a signal reflected from the matching circuit 10c side, to the power amplifier 6b side. The isolator 8b will be described in detail later.

The SAW filter 11e constitutes a processing circuit that performs a predetermined process on the input signal RFin_BC6 and that outputs the resultant signal as an output signal RFout1_BC6 to the outside of the circuit module 1. Specifically, the SAW filter 11e is a band-pass filter that allows a high-frequency signal of a predetermined frequency band (2 GHz band) to pass therethrough and that does not allow a high-frequency signal of a frequency out of the predetermined frequency band to pass therethrough.

The matching circuit 10c is a circuit that provides impedance matching between the output impedance of a core isolator 30b (the details will be described later) included in the isolator 8b and the input impedance of the SAW filter 11e. The matching circuit 10c is provided between the isolator 8b and the SAW filter 11e, and preferably includes, for example, a combination of a capacitor, an inductor, and the like.

The SAW filter 11f performs a predetermined process on an input signal RFin1_BC6 and outputs the resultant signal to a receiving circuit (not shown). Note that, as shown in FIG. 1, the SAW filters 11e and 11f are preferably defined by or included in one electronic component.

In addition, as shown in FIG. 2, a capacitor Cc is provided between the signal path R2 and a wire through which the output signal Coupler out is outputted. Specifically, one end of the capacitor Cc is connected between the isolator 8b and the power amplifier 6b, and the other end of the capacitor Cc is connected to the wire through which the output signal Coupler out is outputted. The capacitor Cc outputs a portion of the input signal RFin_BC6 amplified by the power amplifier 6b, as the output signal Coupler out to the outside of the circuit module 1.

The metal case 50 is mounted to the circuit board 2 and has a principal surface S3 that faces the principal surface S1 of the circuit board 2 and that has a substantially rectangular shape. The metal case 50 covers the SAW filters 3a to 3c, the switch 4, the power amplifiers 6a and 6b the coupler 7, the isolators 8a and 8b, the switch 9, the matching circuits 10a to 10c, and the SAW filters 11a to 11f with the principal surface S3. Further, a ground potential is applied to the metal case 50 through a ground electrode in the circuit board 2.

Figure 3:
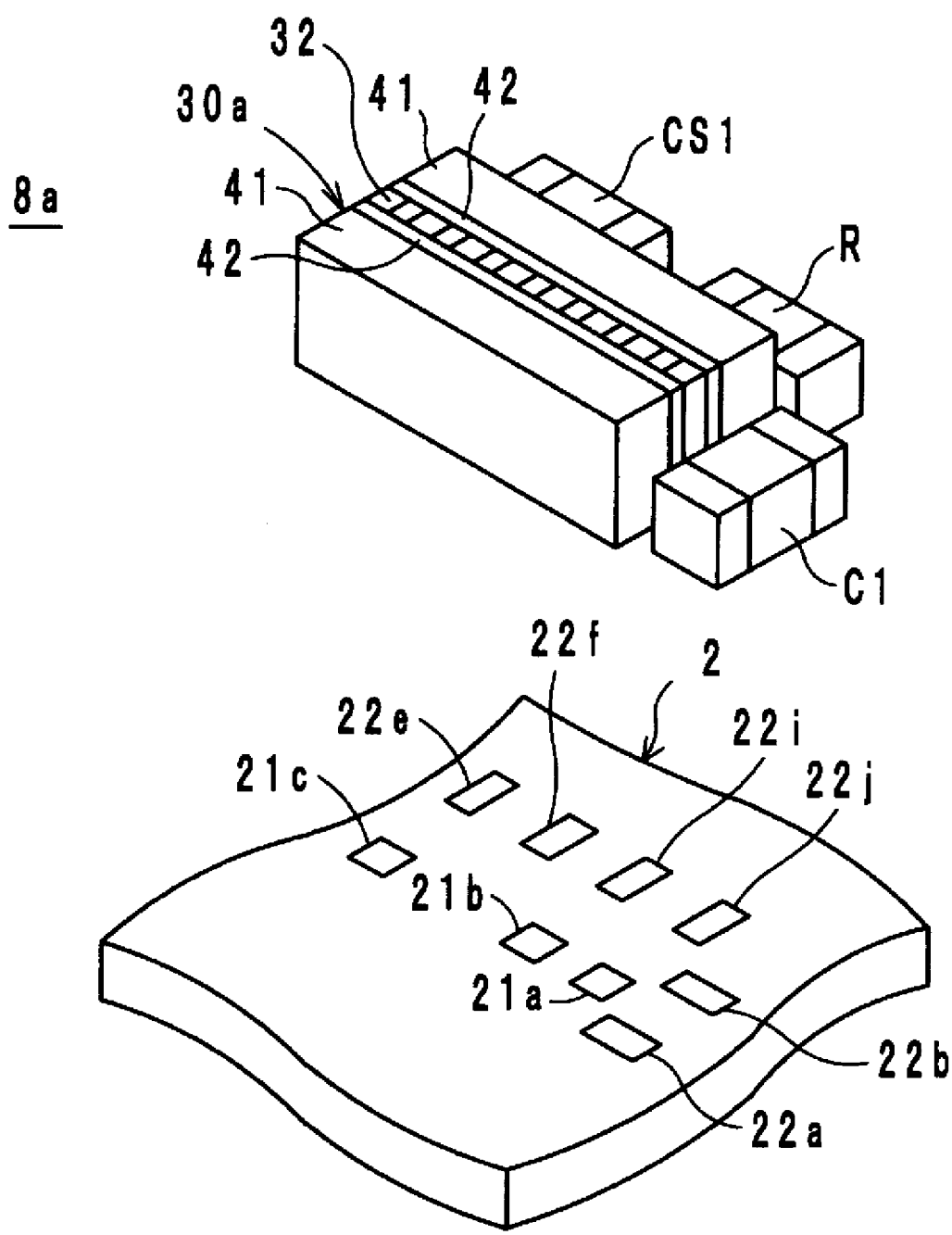
FIG. 3 is an external perspective view of an isolator.
Figure 4:
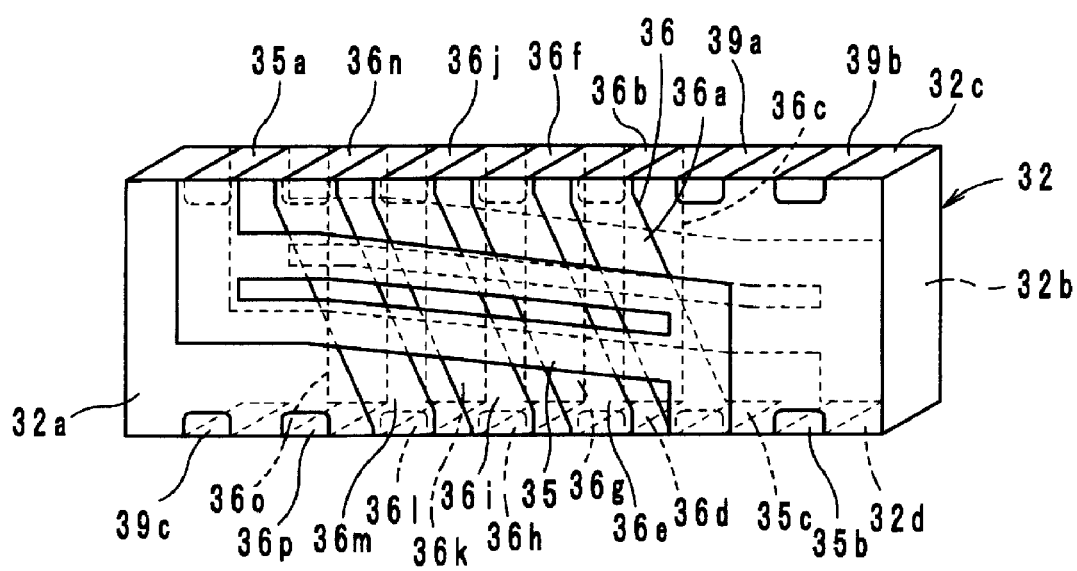
FIG. 4 is an external perspective view of a ferrite provided with center electrodes.
Figure 5:
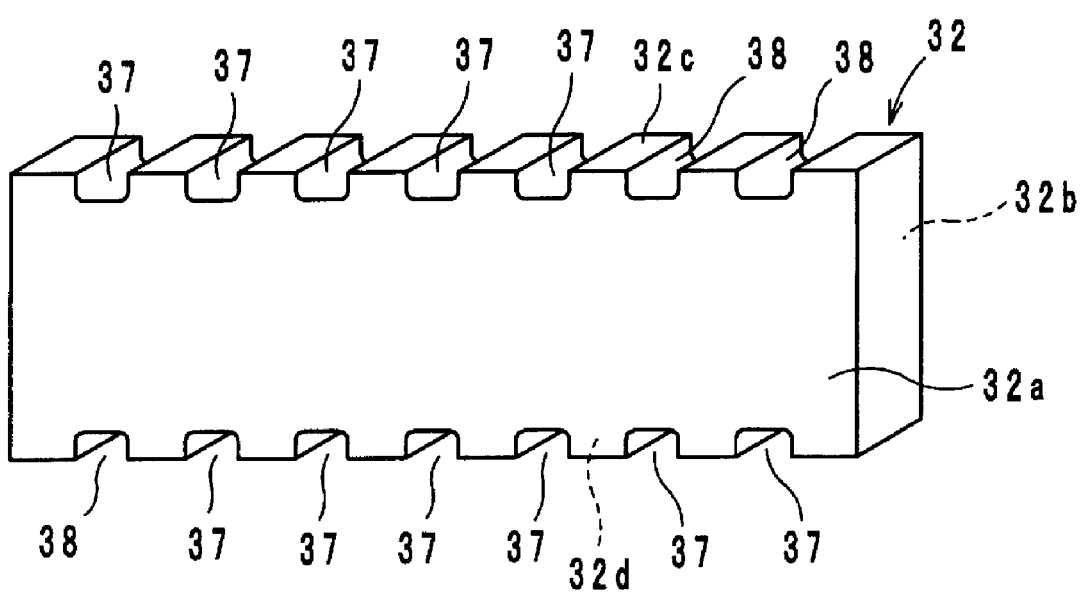
FIG. 5 is an external perspective view of the ferrite.
Figure 6:
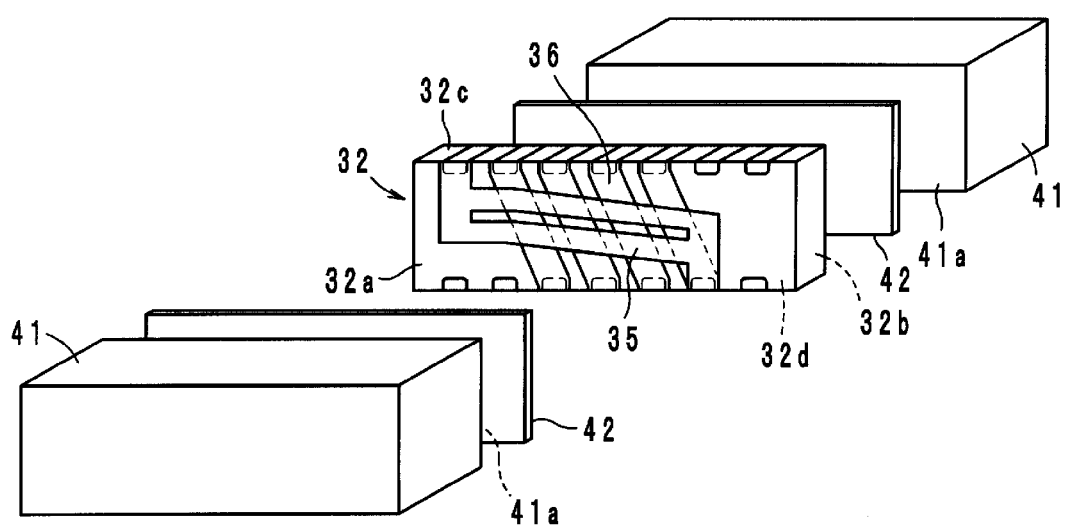
FIG. 6 is an exploded perspective view of a core isolator.

Hereinafter, the isolators 8a and 8b will be described with reference to the drawings. FIG. 3 is an external perspective view of the isolator 8a. FIG. 4 is an external perspective view of a ferrite 32 provided with center electrodes 35 and 36. FIG. 5 is an external perspective view of the ferrite 32. FIG. 6 is an exploded perspective view of the core isolator 30a or 30b.

The isolator 8a is a lumped constant isolator, and includes the circuit board 2, the core isolator 30a, capacitors C1 and CS1, and a resistor R as shown in FIG. 3. Similarly to the isolator 8a, the isolator 8b is also a lumped constant isolator, and includes the circuit board 2, the core isolator 30b, the capacitors C1 and CS1, and the resistor R. Note that each of the isolators 8a and 8b does not have a yoke for preventing a direct-current field from leaking to the outside. The configurations of the isolators 8a and 8b are the same, and thus only the isolator 8a will be described below.

As shown in FIG. 3, the core isolator 30a includes the ferrite 32 and a pair of permanent magnets 41. Note that the core isolator 30a in the present preferred embodiment is a portion consisting of only the ferrite 32 and the permanent magnets 41. As shown in FIG. 4, in the ferrite 32, the center electrodes 35 and 36 are provided on front and back principal surfaces 32a and 32b thereof so as to be electrically insulated from each other. The ferrite 32 has a substantially rectangular parallelepiped shape including the opposing principal surfaces 32a and 32b that are parallel or substantially parallel to each other.

The permanent magnets 41 are attached to the principal surfaces 32a and 32b, for example, through an epoxy adhesive 42 such that a direct-current field is applied to the ferrite 32 in a direction substantially perpendicular to the principal surfaces 32a and 32b (see FIG. 6). A principal surface 41a of each permanent magnet 41 preferably has the same dimension as those of the principal surfaces 32a and 32b of the ferrite 32. The ferrite 32 and the permanent magnets 41 are arranged so as to face each other in a state where the outer shapes of the principal surfaces 32a and 32b correspond to the outer shapes of the principal surfaces 41a.

The center electrode 35 is a conductor film. In other words, as shown in FIG. 4, on the principal surface 32a of the ferrite 32, the center electrode 35 extends upward from the lower right portion so as to incline at a relatively low angle relative to a long side of the principal surface 32a and so as to branch into two portions. Then, the center electrode 35 extends upward to the upper left portion and turns to the principal surface 32b through an intermediate electrode 35a on an upper surface 32c of the ferrite 32. Further, the center electrode 35 is arranged on the principal surface 32b so as to branch into two portions that overlap the two portions on the principal surface 32a in perspective view. One end of the center electrode 35 is connected to a connection electrode 35b located on a lower surface 32d of the ferrite 32. The other end of the center electrode 35 is connected to a connection electrode 35c located on the lower surface 32d. In this manner, the center electrode 35 is wound on the ferrite 32 by one turn. The center electrode 35 and the center electrode 36, which will be described below, intersect each other so as to be insulated from each other, by providing an insulating film therebetween. The angle at which the center electrodes 35 and 36 intersect each other is set according to need, whereby the input impedance and the insertion loss are adjusted.

The center electrode 36 is a conductor film. In the center electrode 36, a 0.5-turn part 36a is arranged on the principal surface 32a so as to extend upwardly from the lower right portion to the upper left portion at a relatively high angle relative to the long side of the principal surface 32a and so as to intersect the center electrode 35. The 0.5-turn portion 36a turns to the principal surface 32b through an intermediate electrode 36b on the upper surface 32c. A one-turn portion 36c is arranged on the principal surface 32b so as to substantially perpendicularly intersect the center electrode 35. A lower end portion of the one-turn part 36c turns to the principal surface 32a through an intermediate electrode 36d on the lower surface 32d, and a 1.5-turn portion 36e is arranged on the principal surface 32a so as to be parallel or substantially parallel to the 0.5-turn part 36a and so as to intersect the center electrode 35. The 1.5-turn portion 36e turns to the principal surface 32b through an intermediate electrode 36f on the upper surface 32c. Similarly, a 2-turn portion 36g, an intermediate electrode 36h, a 2.5-turn portion 36i, an intermediate electrode 36j, a 3-turn portion 36k, an intermediate electrode 36l, a 3.5-turn portion 36m, an intermediate electrode 36n, and a 4-turn portion 36o are disposed on the surface of the ferrite 32. Both ends of the center electrode 36 are connected to the connection electrodes 35c and 36p, respectively, located on the lower surface 32d of the ferrite 32. The connection electrode 35c is shared as a connection electrode at an end of each of the center electrode 35 and the center electrode 36.

The connection electrodes 35b, 35c, and 36p and the intermediate electrodes 35a, 36b, 36d, 36f, 36h, 36j, 36l, and 36n are provided preferably by applying an electrode conductor such as silver, a silver alloy, copper, or a copper alloy to recesses 37 (see FIG. 5) formed on the upper surface 32c and the lower surface 32d of the ferrite 32 or filling the recesses 37 with the electrode conductor. In addition, recesses 38 are provided on the upper surface 32c and the lower surface 32d so as to be parallel or substantially parallel to various electrodes, and dummy electrodes 39a, 39b, and 36c are provided therein. Such electrodes are preferably formed by previously forming through holes in a mother ferrite board, filling the through holes with an electrode conductor, and then cutting the mother ferrite board at positions where the through holes are divided. These electrodes may be formed as conductor films in the recesses 37 and 38.

As the ferrite 32, a YIG ferrite or the like is used. The center electrodes 35 and 36 and the various electrodes can be formed as thick films or thin films of silver or a silver alloy by a method such as printing, transferring, or photolithography, for example. As the insulating film between the center electrodes 35 and 36, a dielectric thick film of glass, alumina, or the like, a resin film of polyimide or the like, or the like can be used, for example. These films can be also formed by a method such as printing, transferring, or photolithography.

Note that the ferrite 32 including the insulating film and various electrodes can be collectively baked using a magnetic material. In this case, Pd, Ag, or Pd/Ag, which are resistant to baking at high temperatures, is preferably used as the various electrodes, for example.

For the permanent magnets 41, strontium, barium, or lanthanum-cobalt ferrite magnets are generally used. A one-part thermosetting epoxy adhesive is preferably used as the adhesive 42 that adheres the permanent magnets 41 and the ferrite 32.

The circuit board 2 is preferably formed from the same type of a material as that of a general multilayer printed board, but may be a multilayer board obtained by laminating a plurality of ceramic insulating layers. As shown in FIG. 3, terminal electrodes 21a, 21b, 21c, 22a, 22b, 22e, 22f, 22i, and 22j to mount the core isolator 30a, the capacitors C1 and CS1, and the resistor R, input/output electrodes, a ground electrode (not shown), and the like, are preferably provided on a surface of the circuit board 2.

The core isolator 30a is mounted on the circuit board 2. Specifically, the connection electrodes 35b, 35c, and 36p on the lower surface 32d of the ferrite 32 are unified with the terminal electrodes 21a, 21b, and 21c on the circuit board 2 by reflow soldering. In other words, the core isolator 30a is fixed to the circuit board 2 by the terminal electrodes (fixing portions) 21a, 21b, and 21c that are arranged in a line. Further, the core isolator 30a is unified with the circuit board 2 by the lower surfaces of the permanent magnets 41 being adhered thereto with an adhesive.

The capacitors C1 and CS1 and the resistor R are reflow-soldered to the terminal electrodes 22a, 22b, 22e, 22f, 22i, and 22j on the circuit board 2. The capacitor CS1 is a circuit arranged to provide impedance matching between the input impedance of the core isolator 30a and the output impedance of the coupler 7. The core isolator 30a, the capacitors C1 and CS1, and the resistor R are connected to each other via wires in the circuit board 2, and constitute the isolator 8a.

Figure 7:
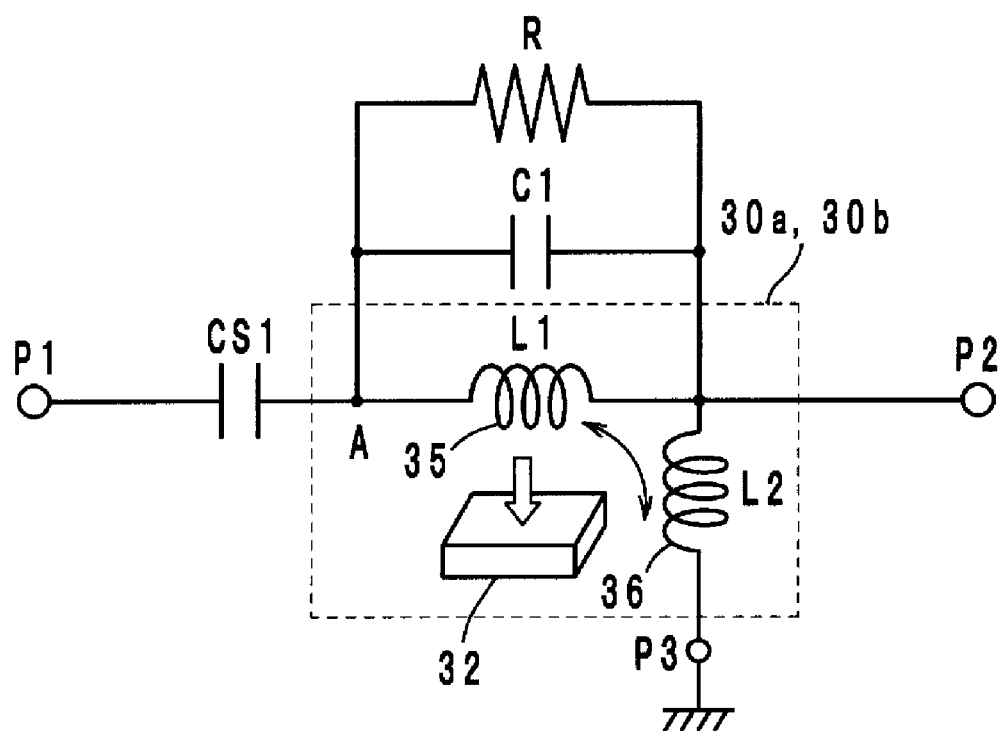
FIG. 7 is an equivalent circuit diagram of the isolator.

Next, the circuit configurations of the isolators 8a and 8b will be described with reference to the drawing. FIG. 7 is an equivalent circuit diagram of the isolator 8a or 8b.

An input port P1 is connected to the capacitor C1 and the resistor R through the capacitor CS1. The capacitor CS1 is connected to one end of the center electrode 35. The other end of the center electrode 35 and one end of the center electrode 36 are connected to the resistor R and the capacitor C1, and connected to an output port P2. The other end of the center electrode 36 is connected to a ground port P3.

In the isolators 8a and 8b each having the equivalent circuit described above, the one end of the center electrode 35 is connected to the input port P1, the other end of the center electrode 35 is connected to the output port P2, the one end of the center electrode 36 is connected to the output port P2, and the other end of the center electrode 36 is connected to the ground port P3. Thus, each of the isolators 8a and 8b can preferably be formed as a two-port lumped constant isolator having low insertion loss, for example.

In the circuit module 1 configured as described above, the size can be reduced without causing a loss in a transmission signal. Specifically, in the transmission device described in Japanese Unexamined Patent Application Publication No. 2008-154201, it is necessary to provide matching circuits at three locations, namely, in the isolator, between the switch and the first duplexer, and between the switch and the second duplexer.

Meanwhile, in the circuit module 1, as shown in FIG. 2, the matching circuit 10a is preferably provided between the switch 9 and the SAW filter 11a. Thus, impedance matching between the output impedance of the core isolator 30a and the input impedance of the SAW filter 11a is provided in the first frequency band. Similarly, the matching circuit 10b is provided between the switch 9 and the SAW filter 11c. Thus, impedance matching between the output impedance of the core isolator 30a and the input impedance of the SAW filter 11c is provided in the second frequency band. By such a configuration, impedance matching of each of transmission signals of the first and second frequency bands can be provided, and losses in the transmission signals can be prevented from being caused. In addition, the function of the output-side matching circuit of the isolator 8a is included in the matching circuit 10a and the matching circuit 10b, and thus a matching circuit to provide impedance matching between the output impedance of the core isolator 30a and the input impedance of the switch 9 does not need to be provided between the core isolator 30a and the switch 9. As described above, in the circuit module 1, it suffices that the matching circuits 10a and 10b are provided at two locations, respectively. Thus, in the circuit module 1, without causing a loss in a transmission signal, the number of electronic components can be reduced as compared to that in the transmission device described in Japanese Unexamined Patent Application Publication No. 2008-154201. Therefore, the size can be reduced. Moreover, each matching circuit can be designed so as to be adapted to the frequency of a signal that passes through a signal path thereof, and thus a loss in the signal path can be reduced.

The circuit module 1 configured as described above is not limited to that described in the preferred embodiments, and can be modified without departing from the scope and spirit of the present invention.

The matching circuits 10a to 10C preferably are circuits arranged to provide impedance matching, but, for example, may serve as filters each of which allows a signal of a predetermined frequency band to pass therethrough. Since the matching circuits 10a to 10c are provided in the stages subsequent to the power amplifiers 6a and 6b, high-order harmonics generated in the power amplifiers 6a and 6b can be eliminated.

Further, in FIG. 1, the core isolators 30a and 30b are located distantly from each other, but may be located adjacently to each other. When the core isolators 30a and 30b are located adjacently to each other, the matching circuit 10a or the matching circuit 10b is desirably mounted on the circuit board 2 so as to be located between the core isolators 30a and 30b. By so doing, the matching circuit 10a or the matching circuit 10b serves as a shield. Thus, influence of the direct-current field of the core isolator 30a on the direct-current field of the core isolator 30b can be prevented and minimized, while influence of the direct-current field of the core isolator 30b on the direct-current field of the core isolator 30a can be prevented and minimized.

As described above, preferred embodiments of the present invention are useful for circuit modules, and in particular, are advantageous in achieving size reduction without causing a loss in a transmission signal.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A circuit module comprising:
a core isolator including:
a ferrite;
a permanent magnet arranged to apply a direct-current field to the ferrite;
a first center electrode that is provided in the ferrite, the first center electrode being connected at one end thereof to an input port and connected at another end thereof to an output port; and
a second center electrode that is provided in the ferrite so as to intersect the first center electrode in an insulating manner, the second center electrode being connected at one end thereof to the output port and connected at another end thereof to a ground port;
a branch portion that is connected at one end thereof to the output port of the core isolator and is arranged to outputs to a first signal path or a second signal path, a signal outputted from the output port;
a first processing circuit that is provided on the first signal path; and
a first matching circuit that is provided on the first signal path so as to be connected to a switch terminal on the first signal path side of the branch portion to provide impedance matching between an output impedance of the core isolator and an input impedance of the first processing circuit.

2. The circuit module according to claim 1, wherein the first processing circuit and/or the second processing circuit are filters each arranged to allow a high-frequency signal of a first frequency band to pass therethrough and to not allow a high-frequency signal having a frequency out of the first frequency band to pass therethrough.

3. The circuit module according to claim 1, wherein a matching circuit to provide output impedance between the output impedance of the core isolator and the input impedance of the first processing circuit is not provided between the core isolator and the branch portion.

4. The circuit module according to claim 1, further comprising:
a second processing circuit that is provided on the second signal path; and
a second matching circuit that is provided on the second signal path so as to be connected to a switch terminal on the second signal path side of the branch portion to provide impedance matching between the output impedance of the core isolator and an input impedance of the second processing circuit.

5. The circuit module according to claim 4, wherein the first matching circuit and/or the second matching circuit define filters.

6. The circuit module according to claim 4, further comprising a circuit board, wherein a plurality of the core isolators is mounted on the circuit board, and the first matching circuit or the second matching circuit is arranged on the circuit board so as to be located between the core isolators.

* * * * *